(12) United States Patent
Arnault et al.

(10) Patent No.: US 12,556,058 B2
(45) Date of Patent: Feb. 17, 2026

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Emmanuel Benevise, Monts (FR)

(73) Assignee: AKTIEBOLAGET SKF, Gothenburg (SE)

( * ) Notice: Subject to any disclaimer, the term of this patent is extended or adjusted under 35 U.S.C. 154(b) by 202 days.

(21) Appl. No.: 18/470,951

(22) Filed: Sep. 20, 2023

(65) Prior Publication Data

US 2024/0128827 A1    Apr. 18, 2024

(30) Foreign Application Priority Data

Oct. 12, 2022 (FR) ..................................... 2210445

(51) Int. Cl.
*H02K 5/14* (2006.01)
*H02K 11/40* (2016.01)

(52) U.S. Cl.
CPC ............... *H02K 5/14* (2013.01); *H02K 11/40* (2016.01)

(58) Field of Classification Search
CPC ...... B65G 47/61; F16C 19/06; F16C 2380/26; F16C 41/002; H01R 39/24; H02K 11/40; H02K 2205/03; H02K 5/14; H02K 7/08
See application file for complete search history.

(56) References Cited

U.S. PATENT DOCUMENTS

| | | | |
|---|---|---|---|
| 2005/0011718 A1* | 1/2005 | Arnault | F16D 23/14 29/898.07 |
| 2019/0296617 A1* | 9/2019 | Hubert | H01R 39/64 |
| 2021/0021180 A1 | 1/2021 | Hubert et al. | |
| 2021/0088076 A1* | 3/2021 | Knoblauch | F16C 19/52 |
| 2021/0310517 A1* | 10/2021 | Berruet | H01R 39/39 |
| 2021/0310518 A1* | 10/2021 | Berruet | F16C 19/06 |
| 2022/0294319 A1* | 9/2022 | Arnault | H02K 13/003 |

FOREIGN PATENT DOCUMENTS

| | | |
|---|---|---|
| FR | 3108955 A1 | 10/2021 |
| FR | 3108956 A1 | 10/2021 |
| FR | 3120754 A1 | 9/2022 |

OTHER PUBLICATIONS

Preliminary Search Report from the French Patent Office dated May 26, 2023 in related French application No. FR2210445, including Search Report and Written Opinion.

* cited by examiner

*Primary Examiner* — Naishadh N Desai
(74) *Attorney, Agent, or Firm* — J-TEK LAW PLLC; Scott T. Wakeman; Mark A. Ussai

(57) ABSTRACT

A grounding brush assembly includes a grounding brush having a plurality of conductive fibers and a support including a mounting portion housing the conductive fibers and first and second lateral flanges extending from the mounting portion and fitting axially around the conductive fibers. A mounting plate is integral with the support and is provided with at least one radial portion extending radially outwardly relative to the mounting portion of the support. The free end of the radial portion of the mounting plate at least partially defines the outer diameter of the assembly.

16 Claims, 4 Drawing Sheets

GROUNDING BRUSH ASSEMBLY

CROSS-REFERENCE

This application claims priority to French patent application no. 2210445 filed on Oct. 12, 2022, the contents of which are fully incorporated by reference.

BACKGROUND OF THE INVENTION

The present invention relates to the field of grounding devices, and more particularly to grounding devices for controlling the shaft current generated in electric motors or machines, such as grounding brush assemblies.

In an electric motor or machine, at least one rolling bearing is mounted between the motor or machine housing and the rotating shaft to support this shaft. During operation when the shaft is rotating, an electrical potential difference may occur between the shaft and the motor or electric machine housing. Such an electrical potential difference may generate an electrical current between the inner ring of the rolling bearing, which is integral with the rotating shaft, and the outer ring, which is integral with the housing. The electrical current passing through the components of the rolling bearing may damage these components, especially the rolling elements and raceways on the inner and outer rings. Electrical discharges may also generate vibrations.

To overcome these disadvantages, it is known to earth or ground the rotating shaft using a grounding brush comprising conductive fibers. The grounding brush is usually mounted in the bore of the electric motor housing so that the free ends of the fibers are in radial contact with the outer surface of the rotating shaft. Due to the conductivity of the fibers, the brush is maintained at the same electrical potential as the housing of the electric motor. The inner and outer rings of the roller bearing are also at the same electrical potential, which reduces or even eliminates problematic electrical discharges through the roller bearing.

A grounding brush assembly as taught in US patent publication no. 2021/0021180A1 comprises a grounding brush having a support and a plurality of conductive fibers mounted in the support, and an annular mounting plate having a plurality of tabs for radially and axially retaining the grounding brush support and an annular outer flange radially surrounding the brush and the tabs. The tabs are formed by plastic deformation of the mounting plate. However, such a grounding brush assembly is not suitable when the bearing is mounted axially freely inside the motor housing and axially biased by a spring.

SUMMARY OF THE INVENTION

The present invention aims to remedy the drawback noted above.

The invention relates to a grounding brush assembly comprising a grounding brush provided with a plurality of conductive fibers and a support comprising a mounting portion within which the conductive fibers are housed, and first and second side flanges extending from the mounting portion and fitting axially around the conductive fibers. The grounding brush assembly includes a mounting plate integral with the support and having at least one radial portion extending radially outwardly from the mounting portion of the support.

According to a general feature of the present invention, the free end of the radial portion of the mounting plate defines at least in part, i.e., at least partially defines, the outer diameter of the assembly. In other words, the radial portion of the mounting plate is not extended axially or obliquely from its large-diameter edge. Preferably, the radial portion of the mounting plate extends entirely radially.

In one embodiment, the mounting plate is provided with at least one resiliently deformable tab starting from the radial portion and projecting axially from the radial portion. Preferably, the tab and mounting plate are made in one piece, in particular in a stamping operation. This facilitates manufacturing of the grounding brush assembly.

Preferably, the radial portion of the mounting plate, the first and second side flanges and the mounting portion each have an annular shape. Alternatively, the radial portion of the mounting plate, the first and second side flanges and the mounting portion may extend over an angular sector of less than 360° so as to be generally arcuate.

In a particular embodiment, the mounting plate and the support are made in one piece.

In another embodiment, the mounting plate comprises a plurality of tabs for axial and radial retention on the support. In this embodiment, the mounting plate and support are two separate parts.

The present invention also relates to an electric machine or motor comprising a housing, a shaft, a grounding brush assembly as defined above mounted radially between the housing and the shaft, at least one bearing interposed between the shaft and the bore of the housing, a retaining means integral with the housing, and at least one axial biasing means located axially at least in part between the radial portion of the mounting plate of the assembly and the retaining means. The conductive fibers of the assembly are in contact with the shaft, a radial clearance remaining between the free end of the radial portion of the mounting plate and the bore of the housing.

The grounding brush assembly of the present invention enables the bearing to be mounted axially freely within the motor housing while the grounding brush assembly retains the properties of dissipation of electrical charges accumulating on the shaft. During operation of the motor, the electrical charges can be dissipated via the brush assembly, the axial biasing means and the retaining means.

Advantageously, the radial portion of the mounting plate is mounted so as to bear axially against one of the front faces of the bearing.

In a particular embodiment, the axial biasing means and the radial portion of the mounting plate are made in a single piece, i.e., of one-piece construction. In this case, the axial biasing means may be formed or provided by the tab of the mounting plate.

In another embodiment, the axial biasing means comprises a spring axially interposed between the radial portion of the mounting plate and the retaining means.

Preferably, the axial biasing means exerts an axial biasing force on the retaining means that is greater than the friction torque exerted by the conductive fibers on the shaft.

BRIEF DESCRIPTION OF THE SEVERAL VIEWS OF THE DRAWINGS

The present invention will be better understood upon study of the detailed description of embodiments, given by way of examples which are by no means limiting and illustrated by the appended drawings in which.

DETAILED DESCRIPTION OF THE INVENTION

Figure 1:
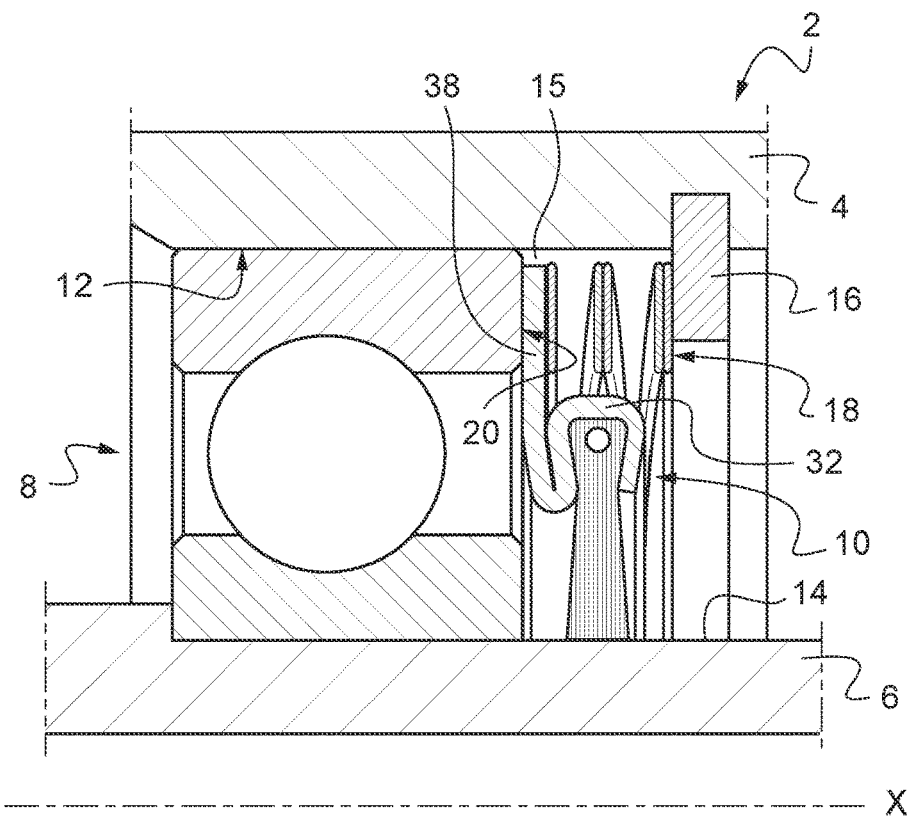
FIG. 1 is an axial cross-sectional view of a grounding brush assembly mounted radially between a rotating shaft and an electric motor housing according to a first exemplary embodiment of the invention.

FIG. 1 shows, in axial section, part of a motor 2 or other electric machine comprising a fixed housing 4, a shaft 6 rotatable about an axis X-X, which is supported radially by a bearing 8, the bearing 8 being axially free in one direction along the axis X-X. Preferably, the bearing 8 is a ball bearing, but may alternatively include any other type of rolling elements, for example cylindrical or tapered rollers, needles, etc. In a further alternative, the bearing 8 may be a plain bearing.

The motor 2 comprises a grounding brush assembly 10 mounted radially between the housing bore 12 and the outer cylindrical surface 14 of the shaft 6. The assembly 10 is radially dimensioned or sized so that a radial clearance 15 remains between the assembly 10 and the bore 12 of the housing 4, the assembly 10 thus being mounted axially freely, in other words, free to displace along the axis X-X. The assembly 10 is therefore not press-fitted into the bore 12 of the housing 4.

The motor 2 comprises a retaining means 16 fixed to the housing 4 and projecting radially inwardly with respect to the bore 12 of the housing 4. The retaining means 16 is preferably formed as a retaining ring or circlip. Alternatively, the retaining means 16 may be formed in one piece with (i.e., integral with) the housing 4, for example the retaining means 16 may be formed as a shoulder of the housing 4.

The motor 2 further comprises a spring 18 interposed axially between the assembly 10 and the retaining means 16. The spring 18 is in contact with the retaining means 16 on the one hand, and the grounding brush assembly 10 on the other. In other words, the spring 18 has one end disposed against the retaining means 16 and an opposing end disposed against the grounding brush assembly 10, and thus extends axially between the retaining means 16 and the brush assembly 10. In the depicted exemplary embodiment, the spring 18 is a helical spring having coils of rectangular cross-section. Alternatively, it is possible to provide a spring 18 having coils with another cross-section, for example square or circular. As a further alternative, the spring 18 may be formed by a stack of Belleville conical washers, as a compressible bar or in any other appropriate manner.

During operation of the motor 2, the grounding brush assembly 10 is in contact with the shaft 6 and contacts an end face 20 of the bearing 8 so that electrical charges accumulating on the shaft 4 during operation of the motor 2 are dissipated. Specifically, charges are transferred from the shaft 6 to the mounting plate 28 and the support 24 of the grounding brush assembly 10, then from the assembly 10 to the spring 18, then from the spring 18 to the retaining means 16 and finally from the retaining means 16 to the bore 12 of the housing.

Figure 2:
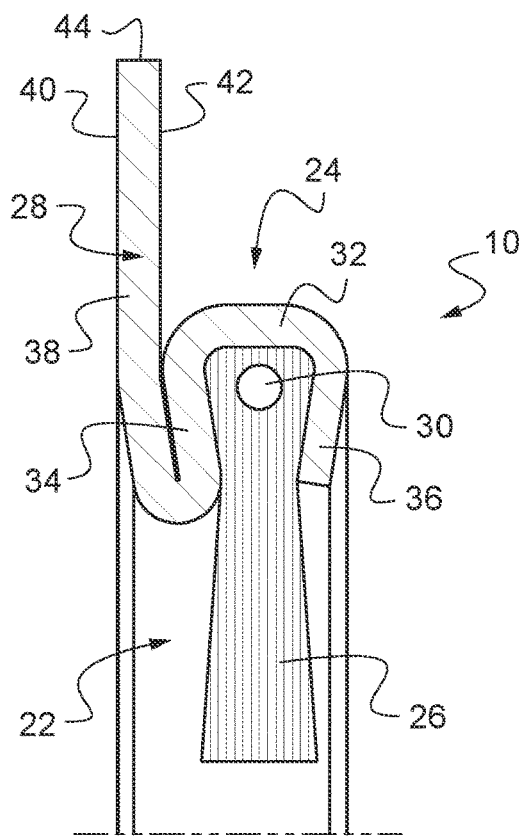
FIG. 2 is a radial cross-sectional view of the assembly shown in FIG. 1.

As best shown in FIG. 2, the grounding brush assembly 10 is generally annular in shape. The assembly 10 comprises a grounding brush 22, which includes a support 24 and conductive fibers 26 housed within the support 24, and also a mounting plate 28.

The grounding brush 22 preferably includes a plurality of individual conductive fibers 26 designed to fit around the shaft 6 of the motor 2. The conductive fibers 26 are made, for example, of carbon, stainless steel or conductive plastics, such as acrylic fibers or nylon. The plurality of conductive fibers 26 are preferably in the form of an open ring. In the depicted example, the conductive fibers 26 are bent around a connection wire 30. The free distal end of each of the conductive fibers 26 is intended to come into radial contact with the outer cylindrical surface 14 of the shaft 6.

To mount and retain the conductive fibers 26, the support 24 includes a mounting portion 32, a first lateral flange 34 extending from the mounting portion 32 on one side and a second lateral flange 36 extending from the mounting portion 32 on the other side.

The mounting plate 28 is annular in shape. The mounting plate 28 extends substantially radially. The mounting plate 28 comprises an annular radial portion 38 projecting radially outwardly from the mounting portion 32 of the support 24. The radial portion 38 comprises two opposed end faces 40, 42 defining an axial thickness. A free, outer radial end 44 of the radial portion 38 defines the outer diameter of the grounding brush assembly 10. The free end 44 of the radial portion 38 is the large-diameter edge of the radial portion 38. A radial clearance 15 (FIG. 1) remains between, or is defined between, the free end 44 of the radial portion 38 and housing bore 12.

In the example shown, the mounting plate 28 is formed in one piece with the support 24. Thus, the mounting plate 28 is therefore integral with the support 24. The first side flange 34 extends to a small-diameter edge of the radial portion 38. The first lateral flange 34 is folded and disposed against the radial portion 38 to form a fold and obtain locally a double thickness of material. The first lateral flange 34 is disposed against the front face 42 of the radial portion 38.

The mounting portion 32 extends from the first lateral flange 34 in a direction axially away from the radial portion 38 of the mounting plate 28. More specifically, the mounting portion 32 extends from a large-diameter edge of the first side flange 34. As depicted, the mounting portion 32 extends axially, but alternatively, the mounting portion 32 may extend obliquely.

The second side flange 36 extends radially inwardly from the mounting portion 32. The second lateral flange 36 extends from the mounting portion 32 on the side opposite the first lateral flange 34.

The mounting portion 32 and the first and second lateral flanges 34, 36 are annular in shape and delimit a channel which is open radially on the inside and within which one end of each of the conductive fibers 26 is located. The first and second lateral flanges 34, 36 fit axially around the conductive fibers 26; that is, each one of the first and second lateral flanges 34, 36 is disposed on separate axial side of the plurality of conductive fibers 26.

In the illustrated exemplary embodiment, the conductive fibers 26 abut radially against the mounting portion 32, with the first and second side flanges 34, 36 extending obliquely inwardly from the mounting portion 32, such that the flanges 34, 36 are generally converging. Alternatively, the first and second side flanges 34, 36 may extend substantially or entirely radially so as to be generally parallel with each other.

The radial portion 38, the first side flange 34, the mounting portion 32 and the second side flange 36 are formed in one piece (i.e., of one piece construction), for example, by cutting and stamping an electrically conductive material, such as aluminum, stainless steel, bronze, copper or other material.

The front face 40 of the radial portion 38 is disposed axially against the front face 20 of the bearing 8, as shown in FIG. 1. The other, opposing front face 42 bears axially against the spring 18. The spring 18 provides a means of axially biasing the assembly 10 against the bearing 8. Preferably, the spring 18 exerts an axial biasing force on the retaining means 16 that is greater than the friction torque exerted by the conductive fibers 26 on the shaft 6.

Figure 3:
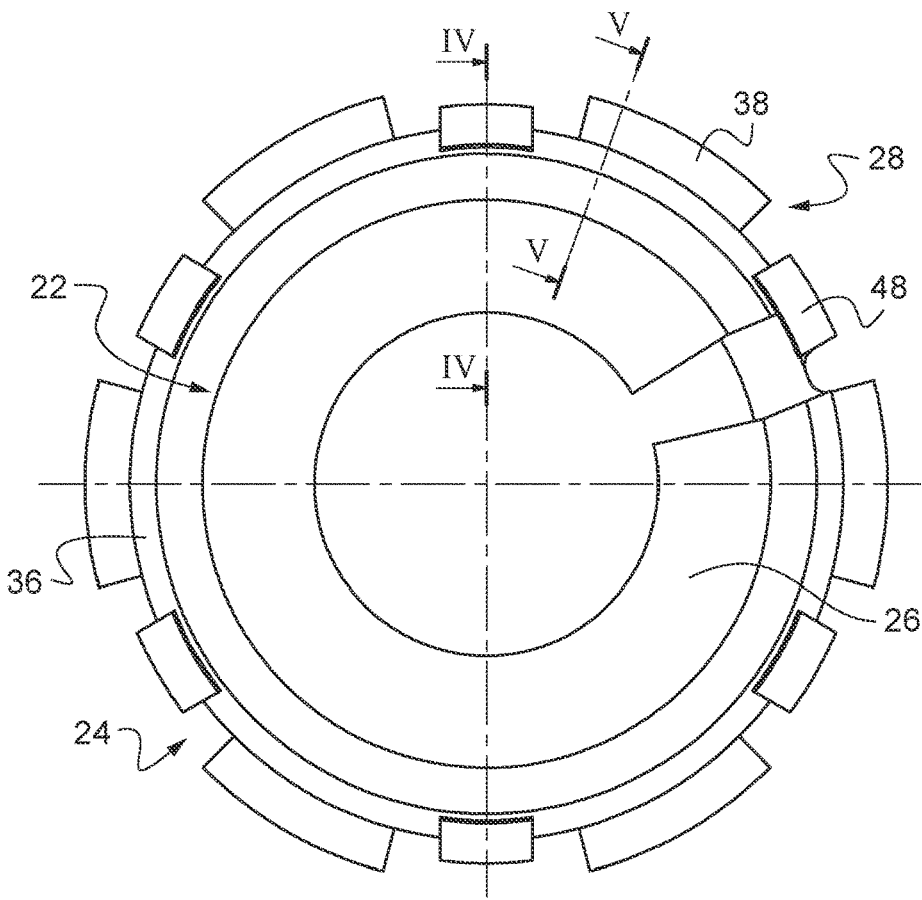
FIG. 3 is a front view of a grounding brush assembly according to a second exemplary embodiment of the invention.
Figure 4:
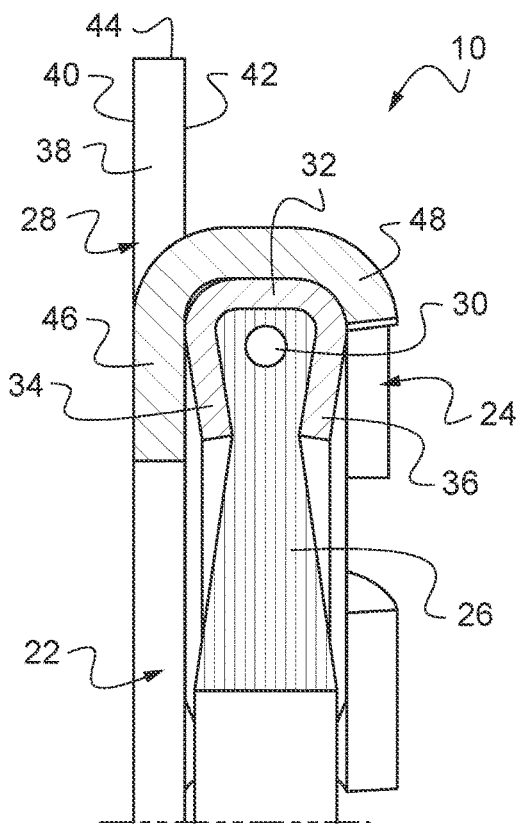
FIG. 4 is a cross-section along axis IV-IV of FIG. 3.
Figure 5:
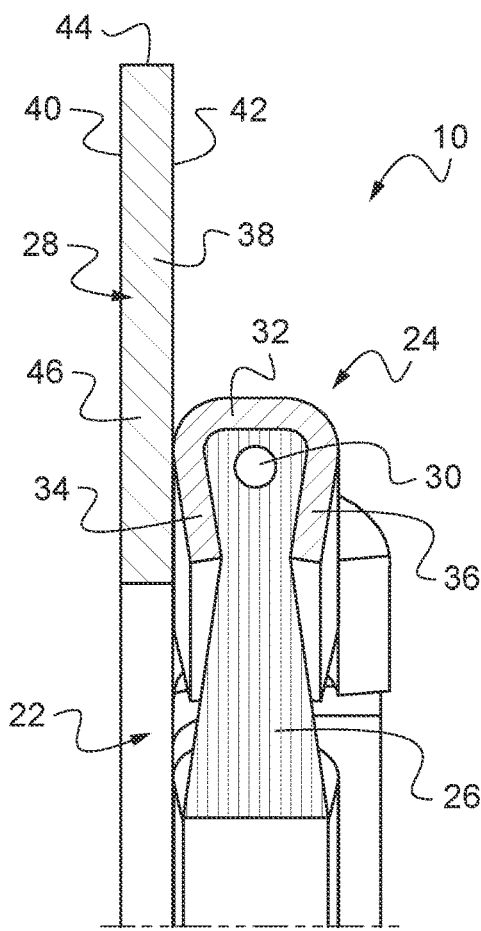
FIG. 5 is a cross-section along axis V-V of FIG. 3.

The exemplary embodiment shown in FIGS. 3 to 5, in which the identical elements bear the same references, differs from the example shown in FIGS. 1 and 2 in that the mounting plate 28 and the support 24 for the brush 22 are two separate parts.

The mounting plate 28 includes a main body 46 axially abutting the first side edge 34 of the support 24, a plurality of axial and radial brush retaining tabs 48 and a plurality of radial portions 38. In the example shown, the mounting plate 28 includes six radial portions 38 and six circumferentially evenly spaced retaining tabs 48.

The retaining tabs 48 extend axially from the main body 46 and are circumferentially spaced from one another, with each one of the radial portions 38 being located circumferentially between two successive retaining tabs 48. Each retaining tab 48 extends axially from the main body 46 so that the retaining tab 48 locally radially surrounds the support 24 of the brush 22 by being in both radial and axial contact with the support 24. The support 24 is thus held axially and radially by the plurality of the retaining tabs 48.

The plurality of radial portions 38 extend entirely radially outwardly from the main body 46. Each radial portion 38 projects radially outwardly from the mounting portion 32 of the support 24. The radial portions 38 are circumferentially spaced apart from each other, preferably evenly or regularly spaced apart as depicted, but may be circumferentially staggered. The free ends 44 of the radial portions 38 collectively define the outer diameter of the grounding brush assembly 10. When the grounding brush assembly 10 is mounted inside the housing 4, a radial clearance 15 remains between, or is defined between, the free ends 44 of all of the radial portions 38 and the housing bore 12.

In the depicted example, a circumferential gap is provided between each radial portion 38 and each adjacent retaining tab 48. In another embodiment, the number of radial portions 38 and the number of retaining tabs 48 may be different; i.e., the number of radial portions 38 is different from the number of retaining tabs 48. The circumferential dimensions of the radial portions 38 and the retaining tabs 48 may be different. The radial portions 38 and the retaining tabs 48 may not be evenly distributed in the circumferential direction.

Figure 6:
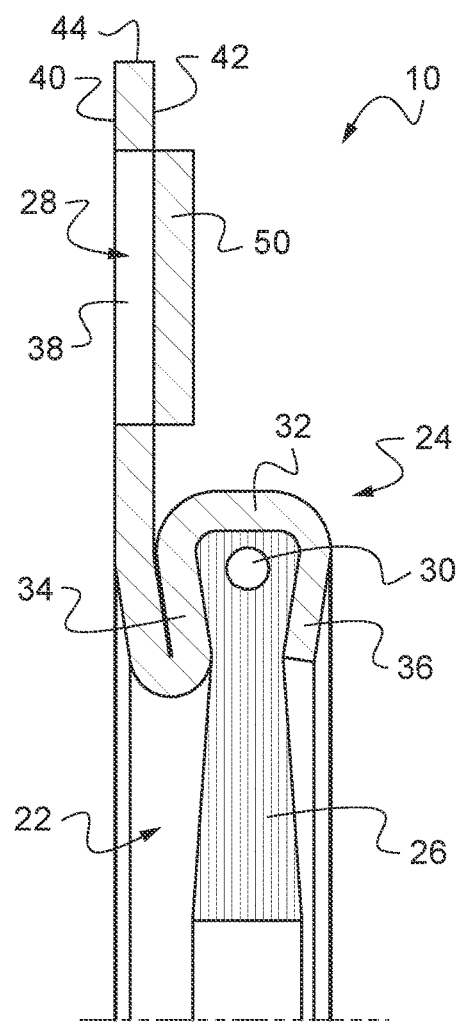
FIG. 6 is an axial cross-sectional view of a grounding brush assembly mounted radially between a rotating shaft and an electric motor housing according to a third exemplary embodiment of the invention.
Figure 7:
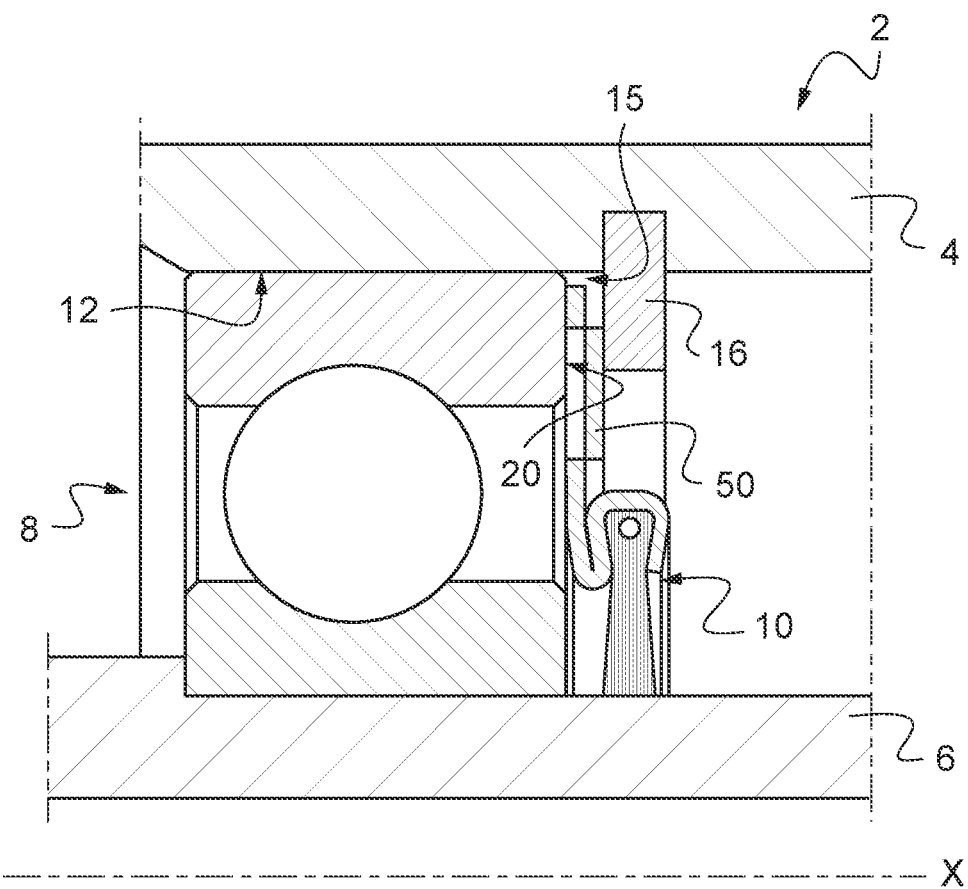
FIG. 7 is an axial sectional view of the assembly shown in FIG. 6, mounted radially between a rotating shaft and an electric motor housing.

The example illustrated in FIGS. 6 and 7, in which the identical elements bear the same references, differs from the example illustrated in FIGS. 1 and 2 in that the mounting plate 28 is provided with tabs 50 which are elastically deformable in the axial direction, originate from the radial portion 38 and project axially with respect to the radial portion 38.

Each deformable tab 50 extends circumferentially from the radial portion 38 of the mounting plate 28 over a limited angular sector, for example between 5° and 15°. The deformable tabs 50 and the radial portion 38 are, for example, of a one-piece design, for example produced by stamping the mounting plate 28, the mounting plate 28 being made of an elastically deformable conductive material. In another embodiment, the deformable tabs 50 may be attachments fixed to the radial portion 38, for example welded to the radial portion 38.

The deformable tabs 50 extend from the radial portion 38 and are evenly spaced from each other in the circumferential direction. In another embodiment, the number of deformable tabs 50 may be different and the deformable tabs 50 may be non-uniformly distributed in the circumferential direction. Alternatively, a single deformable tab 50 may be provided in the radial portion 38 of the mounting plate 28.

The deformable tabs 50 bear axially against the retaining means 16 and form a means of axially biasing the assembly 10 against the bearing 8. Preferably, the deformable tabs 50 exert an axial biasing force on the retaining means 16 that is greater than the friction torque exerted by the conductive fibers 26 on the shaft 6.

In this embodiment, the radial portion 38 is formed in one piece with the support 24; that is the radial portion 38 and the support 24 are of one piece construction. Alternatively, the radial portion 38 and the support 24 may be provided as two separate parts identical to the example shown in FIGS. 3 to 5.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:
   a grounding brush including a plurality of conductive fibers;
   a support including a mounting portion, the conductive fibers being housed within the mounting portion, and first and second lateral flanges extending from the mounting portion and fitting axially around the conductive fibers; and a mounting plate integral with the support and having at least one radial portion extending radially outwardly with respect to the mounting portion of the support, the radial portion of the mounting plate having a free end at least partially defining the outer diameter of the assembly;

wherein the mounting plate and the support are formed in one piece.

2. The grounding brush assembly according to claim 1, wherein the radial portion of the mounting plate extends entirely radially.

3. The grounding brush assembly according to claim 1, wherein the mounting plate is provided with at least one elastically deformable tab extending from the radial portion and projecting axially with respect to the radial portion.

4. The grounding brush assembly according to claim 3, wherein the at least one tab and the mounting plate are formed in one piece.

5. The grounding brush assembly according to claim 1, wherein the mounting plate has an inner radial end integral with the first lateral flange of the support.

6. An electric motor comprising:
a housing;
a shaft;
a grounding brush assembly mounted radially between the housing and the shaft and including a grounding brush having a plurality of conductive fibers, a support including a mounting portion, the conductive fibers being housed within the mounting portion, and first and second lateral flanges extending from the mounting portion and fitting axially around the conductive fibers, and a mounting plate integral with or connected with the support and having at least one radial portion extending radially outwardly with respect to the mounting portion of the support, the radial portion of the mounting plate having a free end at least partially defining the outer diameter of the assembly;
at least one bearing interposed between the shaft and the bore of the housing;
a retaining means integral with the housing; and
at least one axial biasing means located axially at least in part between the radial portion of the mounting plate of the assembly and the retaining means, the conductive fibers of the assembly being in contact with the shaft, a radial clearance remaining between the free end of the radial portion of the mounting plate and the bore of the housing;
wherein the radial portion of the mounting plate extends entirely radially.

7. The motor according to claim 6, wherein the radial portion of the mounting plate is mounted so as to bear axially against one of the front faces of the bearing.

8. The motor according to claim 6, wherein the axial biasing means and the radial portion of the mounting plate are formed in one piece.

9. The motor according to claim 6, wherein the axial biasing means includes a spring axially interposed between the radial portion of the mounting plate and the retaining means.

10. The motor according to claim 6, wherein the mounting plate is provided with at least one elastically deformable tab extending from the radial portion and projecting axially with respect to the radial portion.

11. The motor according to claim 10, wherein the at least one tab and the mounting plate are formed in one piece.

12. The motor according to claim 6, wherein the mounting plate and the support are formed in one piece.

13. The motor according to claim 6, wherein the mounting plate includes a plurality of tabs for axial and radial retention of the support.

14. The motor according to claim 6, wherein the mounting plate is integral with the first lateral flange of the support.

15. The grounding brush assembly according to claim 1, wherein the radial portion of the mounting plate has two opposed end faces and extends entirely radially such that the outer free end does not project axially from either one of the two end faces and the mounting plate has an inner radial end integral with the first lateral flange of the support.

16. An electric motor comprising:
a housing;
a shaft;
a grounding brush assembly mounted radially between the housing and the shaft and including a grounding brush having a plurality of conductive fibers, a support including a mounting portion, the conductive fibers being housed within the mounting portion, and first and second lateral flanges extending from the mounting portion and fitting axially around the conductive fibers, and a mounting plate integral with or connected with the support and having at least one radial portion extending radially outwardly with respect to the mounting portion of the support, the radial portion of the mounting plate having a free end at least partially defining the outer diameter of the assembly;
at least one bearing interposed between the shaft and the bore of the housing;
a retaining means integral with the housing; and
at least one axial biasing means located axially at least in part between the radial portion of the mounting plate of the assembly and the retaining means, the conductive fibers of the assembly being in contact with the shaft, a radial clearance remaining between the free end of the radial portion of the mounting plate and the bore of the housing;
wherein the mounting plate is provided with at least one elastically deformable tab extending from the radial portion and projecting axially with respect to the radial portion.

* * * * *